July 4, 1967    J. H. WHITNEY    3,329,476
ANIMATING APPARATUS
Filed Sept. 21, 1966    2 Sheets-Sheet 1

INVENTOR.
JOHN H. WHITNEY
BY Elliott & Pastoriza
ATTORNEYS

July 4, 1967 J. H. WHITNEY 3,329,476
ANIMATING APPARATUS
Filed Sept. 21, 1966 2 Sheets-Sheet 2

INVENTOR.
JOHN H. WHITNEY
BY Elliott & Pastoriza
ATTORNEYS

United States Patent Office 3,329,476
Patented July 4, 1967

3,329,476
ANIMATING APPARATUS
John H. Whitney, 600 Erskine Drive,
Pacific Palisades, Calif. 90272
Filed Sept. 21, 1966, Ser. No. 584,316
8 Claims. (Cl. 352—87)

ABSTRACT OF THE DISCLOSURE

This disclosure concerns a mechanical means used in conjunction with a camera for animating various symbols or designs such as used in titles and the like in motion pictures. The mechanical structure includes an arm which carries a transparent frame structure upon which there is provided a symbol such as a letter. Above this letter there is positioned a camera arranged to expose a single frame of a motion picture film. As this single frame is exposed, the position of the letter is recorded on the film. A shutter or a stroboscope light is then caused to darken the area and during this darkened period the mechanical apparatus moves the letter an incremental distance to another position. The same frame of film is then exposed so that a second exposure of the letter appears on this frame. The process is repeated until a ring of letters has been provided. This ring may be in the shape of an ellipse or a circle or even a straight line depending upon the mechanical incremental movements of the arm structure.

After a complete cycle of movement has been achieved, a next frame of the motion picture film is positioned in the camera and the process is repeated with a ring or ellipse of smaller radius or axis. After this cycle, a third cycle is commenced. The result is a motion picture film showing the symbol, for example, appearing to gradually merge from an outer ring towards a center point wherein the symbol registers on itself to clearly define the particular symbol or design involved. The mechanical structure is interconnected with a camera so that the animating process may be carried out automatically the camera being triggered to expose the next frame after a cycle of mechanical movement of the arm has been completed. The operation of a shutter or external light source to darken the area during movement of the film is also interconnected with the mechanical arm mechanism.

---

This application is a continuation in part of my co-pending application Ser. No. 326,503, filed Nov. 27, 1963, now abandoned, and entitled Animating Apparatus.

This invention relates to an apparatus to facilitate the production of animated symbols on film.

In providing title designs or similar animated symbolic representations in motion picture and television work, a succession of artists' drawings are exposed on motion picture film to provide the complete composite animated scene. The conventional process is long and tedious and requires manual manipulation of various symbols and the like and the taking of a succession of pictures of the symbol so that the final film will provide the desired animation.

The present invention has as its primary object the provision of an animating apparatus in which a large portion of the work involved in providing animated symbols for titles or other similar work on film can be achieved largely automatically to the end that such film may be produced at a considerably lower cost and with considerably less labor than has been required heretofore.

Another object is to provide an animating apparatus in which unique effects may be very easily realized without the necessity of a large number of artists' drawings.

Briefly, these and other objects and advantages of this invention are attained by providing a basic symbol means which may constitute letters or other caricatures or single symbols drawn by an artist or otherwise provided. The symbol means is supported by an arm in a given plane parallel to a reference plane for photographing. This arm in turn is connected to an operating means such that the arm may be caused to execute various different types of motion. Basically, the motions consist of a back and forth motion and a side-to-side motion which may be compounded so that the symbol means may be made to follow paths describing ellipses of varying eccentricities.

In accordance with a feature of the invention, there is provided an interconnecting means between a camera such as a motion picture camera and the operating means for the arm for automatically operating the camera to expose a successive film frame after a cycle of movement of the symbol means has been completed. Further, individual exposures on a single picture frame may be achieved in accordance with the invention by an exterior exposure means such as a shutter or stroboscopic light arrangement adapted to be operated in response to completion of incremental movements of the symbol means during its cycle.

In accord with further features of the invention, there may be provided an additional symbol means and arm support therefore together with additional operating means for moving the additional arm independently of the first mentioned arm. This first mentioned and additional symbol means may be arranged in overlapping relationship and the degree of overlapping may be varied by adjusting the respective movements of the arms. Composite or double exposures on the film may then be effected so that startling and unique effects can easily be realized.

The mechanical movements of the various symbol means are precise and may be made to repeat themselves consistently so that the resulting animation is smooth and of high quality.

A better understanding of the invention will be had by referring to the accompanying schematic drawings, in which.

In the accompanying drawings, the spacing between various components has been greatly exaggerated in a vertical direction for purposes of clarity. Therefore, the apparent proportions of the components are not as would actually be employed in a commercial embodiment of the apparatus.

Figure 1:
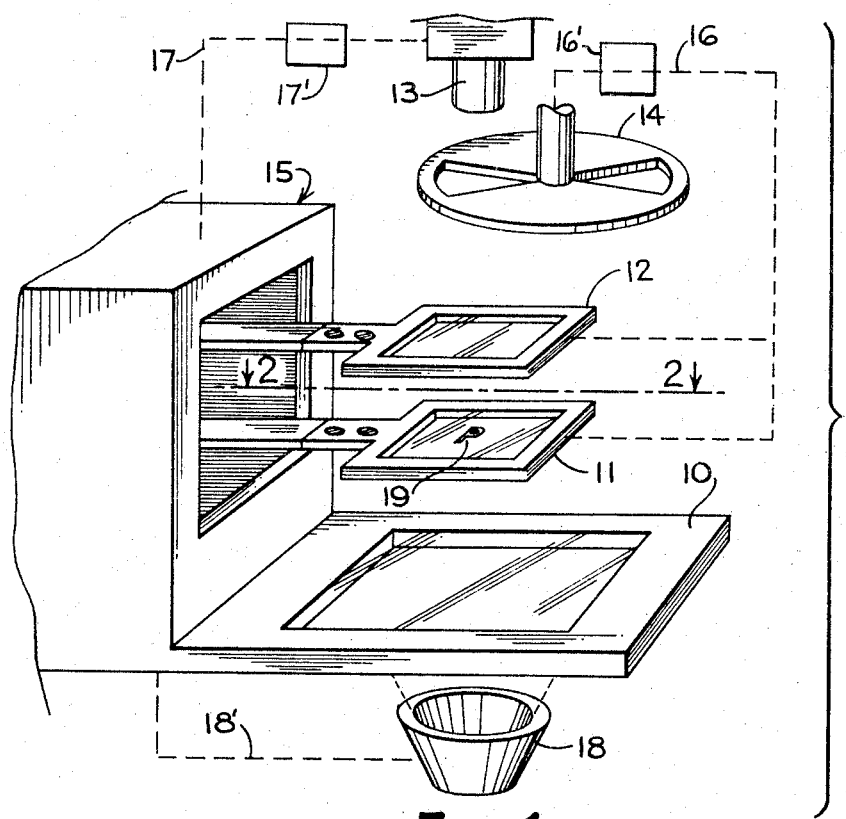
FIGURE 1 is a fragmentary perspective exploded view of certain basic components making up the animating apparatus of this invention.

With reference now to FIGURE 1, there is illustrated schematically a reference surface 10 above which are positioned an arm structure 11 and an additional arm structure 12 in super-imposed relationship. A photographic means such as a modified motion picture camera 13 in turn is positioned to photograph the reference surface 10 and the super-imposed structures 11 and 12. Also included is an exterior exposure means in the form of a shutter means 14 positioned between the camera 13 and the arm structures 11 and 12.

The arm structures 11 and 12 are capable of movements in planes parallel to the plane of the reference surface 10 by suitable operating means 15. In the actual embodiment of the invention, the planes of the arm structures 11 and 12 and the plane of the reference surface 10 would all be very close together to lie substantially in the focal plane of the camera 13. The operating means 15 effects movements of the arm structures 11 and 12 and these movements in turn are arranged to actuate the external shutter means 14 as depicted by the dash-dot line 16 and gear box 16′. The operating means is also interconnected with the camera 13 as indicated by the dash-dot line 17 and gear box 17′ for exposing successive film frames in response to a completion of a cycle of movement of one or both of the arm structures 11 and 12.

A suitable illuminating means such as a light 18 may be disposed beneath the structure as shown.

Figure 2:
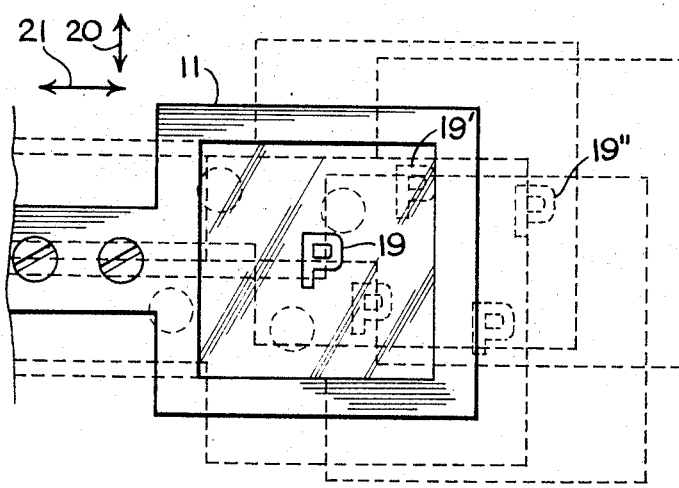
FIGURE 2 is a fragmentary plan view taken in the direction of the arrows 2—2 of FIGURE 1 and serving to illustrate by means of dotted lines successive positions of a symbol means; and, FIGURE 3 is highly schematic exploded perspective view of one type of operating means for effecting desired movements of the structure illustrated in FIGURE 2.

Referring now to the plan view of FIGURE 2 there is shown the arm structure 11 serving to carry a symbol means in the form of the letter P indicated at 19. The operating means is capable of moving the arm 11 in side-to-side directions as indicated by the double-headed arrow 20, and in back and forth directions as indicated by the double-headed arrow 21. These motions may be effected simultaneously so that the symbol 19 may be made to follow paths describing ellipses of varying eccentricities. If the side-to-side motion is completely eliminated so that there is only the back and forth motion, the path constitutes a straight line. On the other hand, if the back and forth motion is eliminated and purely side-to-side motion is effected, there will be described a straight line disposed at right angles to the first mentioned straight line. If equal side-to-side and back and forth motions are effected, there will be described an ellipse of eccentricity 0 or a path describing a circle. Variations in the respective amplitudes of the side-to-side and back and forth movements will provide elliptical paths of eccentricities between 0 and 1.

In the schematic illustration of FIGURE 2 there is illustrated successive incremental positions of the symbol P when a compound motion of the arm 11 is effected. The path of movement describes an ellipse of eccentricity between 0 and 1.

With reference now to both FIGURES 1 and 2, one mode of operation of the apparatus as described will be set forth.

Assume that it is desired to provide an animated title in which the letters P will be repeated in a pattern following a large circle adjacent to the periphery of a central scene, the letters then appearing to move gradually inwardly towards the center of the scene to merge into a clear and distinct single letter P. To provide this animation, the amplitudes of the side-to-side and back and forth motion would be made equal so that the arm 11 would describe a circular path. The interconnection between the operating means for the arm 11 and the exterior shutter 14 would be such that the shutter would, for example, rotate eight times for a complete cycle of operation of the arm over 360 degrees. Since the shutter has two exposure openings, this sequencing of the shutter would result in sixteen successive exposures of the letter P falling on a circle of a diameter determined by the amplitudes of the side-to-side and back and forth compound motion.

A single film frame of a motion picture film in the camera 13 is continuously exposed during the foregoing movement so that there is provided on this film sixteen different exposures of the letter P arranged about in a circle. Of course suitable masking is provided about the frame of the arm 11 to block light from passing about the edges of the frame during its movement. Further the motion picture camera is modified by removal of its shutter during the length of time that a frame of film is exposed.

After the above cycle of operation, the interconnecting means between the operating means and the camera as depicted by the dash-dot line 17 operates to position the next successive film frame in the camera in registration for exposure. At the same time, the amplitudes of the respective side-to-side and back and forth motions are decreased slightly so that a circle of smaller radius is followed by the arm 11 to result in a next successive exposure of sixteen letters slightly closer to the center of the scene. After this cycle had been completed, the camera 13 is again automatically operated to expose the next successive picture frame and another cycle of movement of the arm 11 is carried out with a smaller radius for the circle.

The process is continued until the amplitudes of motion of the arm 11 reach zero at which point the letter or symbol P would be positioned in a stationary location at the center of the scene so that the final exposed picture frame would illustrate the letter P as a single letter in a stationary position.

When the film from the camera 13 is now developed and exposed, there will be provided the desired end result of the symbol P appearing to move from an outer circle into the center. The rate at which the outer circular array of symbols will merge into a center single symbol is adjusted by the rate of change of the radius of the described circle for each successive exposure of the film in the camera 13.

It will be evident from the foregoing that further unique effects may be realized by means of the additional arm structure 12. For example, if the letter P were positioned on the arm structure 12 and super-imposed over the arm structure 11, and the operating means for the arm structure 12 caused to follow a reverse pattern from that for the arm 11, the letter P for the arm 12 would appear to expand outwardly from a center position to outer positions so that when the same were photographed simultaneously through the super-imposed symbols, the resulting film would show an outer ring of the letter P merging towards the center and simultaneously a center letter P merging towards a plurality of outer letters.

Various other effects can be achieved by means of the additional arm structure 12 and the fact that its operating means may effect independent motion thereof relative to motion of the arm 11.

Figure 3:
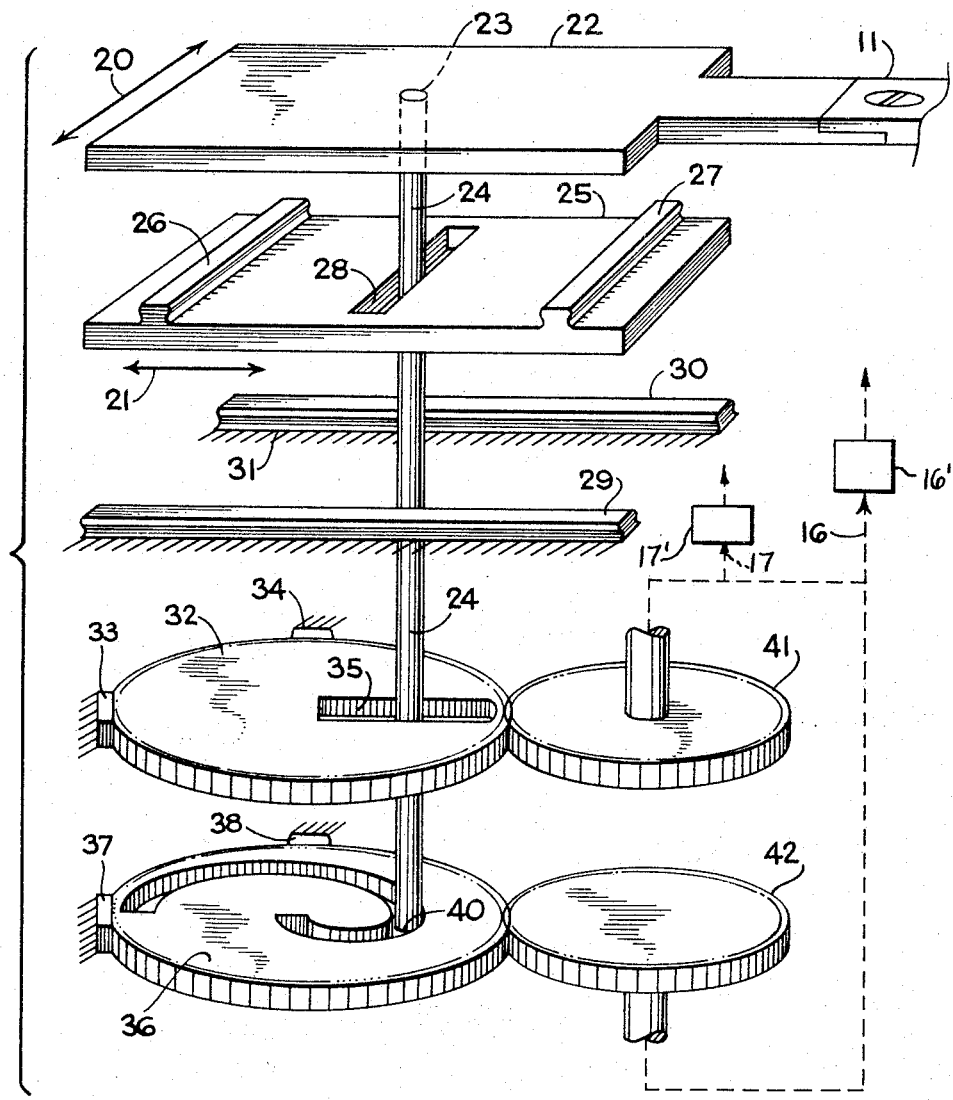

The manner in which motion in side-to-side and back and forth direction is achieved and the manner in which the amplitude of such motions may be easily varied will be evident by now referring to one type of operating means as schematically illustrated in FIGURE 3.

Referring to the upper portion of FIGURE 3, the end of the arm structure 11 is shown at the right hand part of the drawing as secured to a first table 22. From the lower end of this table 22 there is coupled at 23 a downwardly extending pin 24. The overall length of the pin 24 is greatly exaggerated in FIGURE 3 for purposes of clarity. In the actual embodiment, the pin 24 would be relatively short and the various components would be super-imposed, one immediately above the other.

The first table 22 is supported by a second table 25 provided with rails 26 and 27 so that the first table 22 can effect side-to-side motion as indicated by the double-headed arrow 20 corresponding to the double-headed arrow 20 in FIGURE 2. The pin 24 passes through an elongated camming slot 28 in the second table 25 running in a side-to-side direction.

The table 25 in turn is arranged to move in a back and forth direction by mounting the same on rails 29 and 30 stationarily secured as indicated at 31. This back and forth motion is depicted by the double-headed arrow 21 corresponding to the arrow 21 of FIGURE 2.

From the description thus far, it will be evident that if the pin 24 is caused to move in a side-to-side or a back and forth direction or in a path resulting from a compounding of these two directions, the table 22 can follow such movement so that the arm structure 11 will similarly follow such movement.

In the embodiment of FIGURE 3, the means for effecting movement of the pin 24 in side-to-side and back and forth directions takes the form of a first gear disc 32 mounted about its periphery by any suitable bearing means 33 and 34 for rotation about a stationary axis, running parallel to the axis of the pin 24. As shown, the first gear disc 32 includes an elongated camming slot 35 running in a radial direction from the center of the disc towards its periphery. The lower end portion of the pin 24 passes through this slot as shown.

Cooperating with the first disc 32 is a second gear disc 36 positioned below the disc 32 and in coaxial alignment therewith. The disc 36 is mounted for rotation as by suitable peripheral bearings 37 and 38. The top surface of the disc 36 includes a spiral camming groove 39 receiving the extreme lower end portion of the pin 24 as at 40.

The first and second gear discs 32 and 36 map be independently rotated as by any suitable driving means such as gears 41 and 42. The rotation of the discs is communicated mechanically to the exterior shutter 14 of FIGURE 1 as indicated by the dashed line 16 corresponding to the dashed line 16 illustrated in FIGURE 1.

With the foregoing description in mind, the operation of the structure of FIGURE 3 may be briefly described as follows: assume first that a back and forth motion only is desired such as indicated by the double-headed arrow 21. In this event, the first disc 32 is locked against rotation in the position shown and the second disc 36 permitted to rotate in a back and forth or oscillatory motion. This motion will result in the spiral cam groove 39 causing the pin 24 to move back and forth in the slot 35 thereby moving the second table 25 back and forth in the direction of the double-headed arrow 21. This motion of the pin 24 moves the first table 22 in a back and forth direction to move the arm 11 in a corresponding direction.

The amplitude of back and forth movement can easily be controlled by the arcuate degree through which the second gear disc 36 is caused to oscillate back and forth. Thus, if this arcuate extent is 180 degrees, maximum amplitude of back and forth motion will be effected. If the arcuate extent is less than 180 degrees, the amplitude of back and forth movement of the pin 24 will be decreased accordingly.

If it is desired to move the arm 11 solely in a side-to-side direction such as indicated by the doubleheaded arrow 20, the disc 32 is rotated 90 degrees so that the slot 35 is aligned in a direction parallel to the side-to-side slot 28 in the second table 25. The second disc 36 may then again be caused to execute oscillatory movements over an arcuate amplitude determined by the desired amplitude of side-to-side motion, the first disc 32 being locked in its newly oriented position.

If a pure circular motion of the arm structure 11 is desired, the pin 24 is initially positioned within the slot 35 at a desired radial distance from the center of the disc 32. This position may be achieved by rotating the second disc 36 relative to the disc 32 until a corresponding radial position of the cam groove 39 corresponds to the desired radius of the circle. When this initial adjustment has been achieved, the discs 32 and 36 are locked for simultaneous rotation together thereby resulting in the pin 24 simply describing a circular motion and thus moving the table 22 and arm 11 in a circular motion.

To change the radius of this circular motion, it is only necessary to rotate the lower second disc 36 relative to the first disc 32 thereby changing the radial distance of the cam groove portion receiving the end of the pin from the center of the second disc. The discs may then be locked again together for simultaneous rotation to cause the pin 24 to describe a circular motion of smaller radius.

It will be evident that rather than locking the discs together for simultaneous rotation, the lower or second disc 36 may be caused to rotate at a slightly different rate from the upper disc, this difference in rotation being alternately faster and slower. The resulting motion of the arm 11 will then follow a spiral path which spirals inwardly and then outwardly as the relative motion of the disc 36 relative to the disc 32 is changed.

From the foregoing description, it will thus be evident that the simple mechanical mechanism illustrated in FIGURE 3 enables the desired movements of the arm 11 to take place so that desired animation as described in conjunction with FIGURE 2 may be carried out.

It is to be understood that for each particular pattern to be formed, the shutter and camera actuating links depicted by the dashed lines 16 and 17 and the gear ratios in the gear boxes 16' and 17' are pre-adjusted. For example, in forming the pattern described in FIGURE 2, there are provided sixteen successive exposures of the letter P for each cycle or upon completion of one circular path by the arm 11. Thus, the radius of the initial circular path would be adjusted by the position of the pin 24 in the slot 35 by means of the spiral cam in the gear 36 as described. The gears 32 and 36 are then locked together and the coupling between the shutter 14 and gears 32 and 36 through the medium of gears 41 and 42 and gear box 16' is pre-set such that for one revolution of the gears 32 and 36, the shutter 14 rotates exactly eight revolutions. In this respect, it will be understood that when the gears are stopped after one-sixteenth of a revolution, the shutter will also be stopped to effect an exposure, the one-sixteenth of a revolution constituting an incremental step in the operation. Further, the coupling between the gears 32 and 36 and the camera 13 through the medium of the gears 41 and 42 and gear box 17' is pre-set so that a new film frame will be positioned in the camera for exposure each time the gears 32 and 36 complete exactly one revolution.

The operating means for the additional arm structure 12 may be identical to the operating means of FIGURE 3 for the arm 11 but controlled independently. As a consequence, when the arm structures each incorporating symbols are super-imposed and photographed, unique and startling effects can be realized.

In addition, the symbol means may be mounted on the arms for synchronous rotation while the arms follow different paths to provide further unique effects.

From the foregoing description, it will be evident that the present invention has provided a novel animating apparatus in which the production of animated symbols for titles or other work in the television and motion picture industries may be effected rapidly, accurately, and for considerably less cost than has been possible heretofore.

While only one particular type of operating means has been described for effecting motion of the arms, equivalent means for providing similar motions could of course be used. Further, while the successive exposure of a single frame has been effected by an exposure means in the form of an external shutter 14, it is equally possible to operate the light 18 as a stroboscopic light to effect an equivalent result. In this latter event, the stroboscopic light serving as an exterior exposure means would be synchronized with the operating means as indicated by the dashed line 18' in FIGURE 1.

The invention accordingly is not to be thought of as limited to specific details set forth merely for purposes of illustration.

What is claimed is:

1. An animating apparatus including, in combination: camera means adapted upon actuation to expose successive frames of a motion picture film; symbol means; an exterior exposure means to effect successive exposures of said symbol means to a single frame on said film in said camera; an arm connected to said symbol means for moving said symbol means; operating means for moving said arm in side-to-side and back and forth directions simultaneously so that the symbol means may be made to follow paths describing ellipses of varying eccentricities; and interconnecting means between said operating means and said exterior exposure means to operate said exposure means upon completion of an incremental movement of said symbol means whereby a succession of positions of said symbol means may be photographed on a single frame of said film.

2. An apparatus according to claim 1, including interconnecting means between said operating means and said camera for operating said camera to move a successive picture frame of said film into position for exposure in response to completion of a cycle of operation of said operating means.

3. An apparatus for enabling the photographing of animated designs by means of a camera with film comprising, in combination: a reference surface in a given position for photographing by said camera and film; an exterior exposure means; at least one arm supporting a symbol means in a position interposed between said camera and reference surface; and operating means coupled to said arm for moving said arm in a plane parallel to the plane of said reference surface along a desired path, said exposure means being adapted to expose said film after each of a succession of given incremental movements of said arm to effect successive exposures to a single picture frame on said film in said camera of successive positions of said symbols.

4. An apparatus according to claim 3, in which said arm is capable of compound motions in side-to-side and back and forth directions whereby said desired path may be made to describe ellipses of varying eccentricities.

5. An apparatus according to claim 3, in which said film in said camera is shifted one picture frame after a given number of successive exposures has been completed.

6. An apparatus according to claim 3, including an additional arm supporting an additional symbol means in a position interposed between said exterior exposure means and said first mentioned symbol means; and additional operating means coupled to said additional arm for moving said additional arm in a plane parallel to said plane of said reference surface, whereby superposition of said additional symbol means and said first symbol means in various degrees of overlapping may be photographed.

7. An apparatus according to claim 3, in which said operating means includes a first table supporting said arm; a second table disposed beneath said first table; means mounting said first table to said second table for side-to-side movement relative to said second table; means mounting said second table for back and forth movement relative to said reference surface, said second table having an elongated slot extending in a side-to-side direction; a driving pin having one end coupled to said first table, said pin extending through said slot in said second table; and means for moving said pin in side-to-side and back and forth directions to thereby move said first table in side-to-side and back and forth directions.

8. An apparatus according to claim 7, in which said means for moving said pin includes first and second gear discs coaxially aligned with their axes parallel to the axis of said pin and disposed beneath said second table, said first gear disc having a slot therein extending in a radial direction and said second gear disc having a spiral groove, said pin passing through said slot in said first disc and terminating at its lower end in said spiral groove; and means for rotating said first and second discs.

References Cited

UNITED STATES PATENTS

| | | | |
|---|---|---|---|
| 1,253,285 | 1/1918 | Selig | 352—84 |
| 2,052,960 | 9/1936 | Berggren | 352—208 |
| 2,223,849 | 12/1940 | Fogler et al. | 35—29.1 |
| 2,449,702 | 9/1948 | Iwerks | 352—87 |
| 2,466,214 | 4/1949 | Deaton | 352—87 |
| 2,791,165 | 5/1957 | Hoyt | 95—36 |
| 3,173,348 | 3/1965 | Betinis | 352—84 X |
| 3,202,069 | 8/1965 | Cummins | 95—36 |

FOREIGN PATENTS 566,912  1/1945  Great Britain.

JULIA E. COINER, *Primary Examiner.*